(12) United States Patent
Zhang

(10) Patent No.: US 11,961,064 B2
(45) Date of Patent: *Apr. 16, 2024

(54) INFORMATION DISPLAY METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Haiba Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 54 days.

This patent is subject to a terminal disclaimer.

(21) Appl. No.: 17/740,054

(22) Filed: May 9, 2022

(65) Prior Publication Data

US 2022/0270072 A1 Aug. 25, 2022

Related U.S. Application Data

(63) Continuation of application No. 16/808,930, filed on Mar. 4, 2020, now Pat. No. 11,354,647, which is a (Continued)

(30) Foreign Application Priority Data

Sep. 21, 2017 (CN) .......................... 201710860475.1

(51) Int. Cl.
*G06Q 20/32* (2012.01)
*G06Q 20/38* (2012.01)

(52) U.S. Cl.
CPC ..... *G06Q 20/3274* (2013.01); *G06Q 20/3226* (2013.01); *G06Q 20/38* (2013.01); *G06Q 20/3821* (2013.01)

(58) Field of Classification Search
None
See application file for complete search history.

(56) References Cited

U.S. PATENT DOCUMENTS

| 5,862,347 A | 1/1999 | Suzuki et al. |
| 2006/0054695 A1 | 3/2006 | Owada |

(Continued)

FOREIGN PATENT DOCUMENTS

| CN | 105721425 A | 6/2016 |
| CN | 106845266 A | 6/2017 |

(Continued)

OTHER PUBLICATIONS

The World Intellectual Property Organization (WIPO) International Search Report for PCT/CN2018/106174 dated Dec. 26, 2018 6 Pages (including translation).

(Continued)

*Primary Examiner* — Scott S Trotter
*Assistant Examiner* — Amit Patel
(74) *Attorney, Agent, or Firm* — ANOVA LAW GROUP PLLC

(57) ABSTRACT

An information display method, a storage medium, and an electronic device are provided. The method includes: obtaining, by a terminal, resource transfer information used for transferring a resource; splitting, by the terminal, the resource transfer information into multiple pieces of resource transfer sub information; and displaying, by the terminal, a dynamic screen for indicating the resource transfer sub information. A quantity of pieces of the resource transfer sub information indicated on the dynamic screen at one moment is less than a total quantity of the multiple pieces of resource transfer sub information.

20 Claims, 5 Drawing Sheets

Related U.S. Application Data continuation of application No. PCT/CN2018/106174, filed on Sep. 18, 2018.

(56) References Cited

U.S. PATENT DOCUMENTS

| | | |
|---|---|---|
| 2012/0330845 A1 | 12/2012 | Kang |
| 2013/0124413 A1 | 5/2013 | Itwaru |
| 2016/0226839 A1 | 8/2016 | Black et al. |
| 2019/0228399 A1* | 7/2019 | Molnar .............. G06Q 20/3223 |

FOREIGN PATENT DOCUMENTS

| | | |
|---|---|---|
| CN | 107038007 A | 8/2017 |
| JP | 2003317051 A | 11/2003 |
| JP | 2007034625 A | 2/2007 |
| JP | 2016103069 A | 6/2016 |
| JP | 2016222193 A | 12/2016 |

OTHER PUBLICATIONS

Indian Patent Office Examination report for Application No. 202037008005 dated Jun. 23, 2021 7 pages.

The Japan Patent Office (JPO) Notification of Reasons for Refusal for Application No. 2020-516538 and Translation dated May 25, 2021 14 Pages.

Korean Intellectual Property Office (KIPO) Office Action 1 for 20207008078 dated Jun. 29, 2021 10 Pages (including translation).

* cited by examiner

INFORMATION DISPLAY METHOD AND APPARATUS, STORAGE MEDIUM, AND ELECTRONIC DEVICE

CROSS-REFERENCES TO RELATED APPLICATIONS

This application is a continuation application of U.S. patent application Ser. No. 16/808,930, filed on Mar. 4, 2020; U.S. patent application Ser. No. 16/808,930 is a continuation application of PCT Patent Application No. PCT/CN2018/106174, filed on Sep. 18, 2018, which claims priority to Chinese Patent Application No. 201710860475.1, entitled "INFORMATION DISPLAY METHOD AND APPARATUS, STORAGE MEDIUM, AND ELECTRONIC DEVICE" filed with the Chinese Patent Office on Sep. 21, 2017, the entire contents of all of which are incorporated herein by reference.

FIELD OF TECHNOLOGY

The present disclosure relates to the field of the Internet, and specifically, to an information display method and apparatus, a storage medium, and an electronic device.

BACKGROUND OF THE DISCLOSURE

With development of the Internet, mobile payment has gradually become an indispensable part of people's life. Mobile payment, also referred to as mobile phone payment, is a service mode in which a user uses a mobile terminal (usually a mobile phone) to make an account/money payment for consumer goods or services. The mobile payment function is accomplished when an organization or an individual directly or indirectly sends a payment instruction to a financial institution such as a bank, through the mobile terminal, the Internet or proximity sensing, to generate monetary payment and money transfer behavior. With integrations of mobile terminal, the Internet, an application provider and a financial institution, the mobile payment provides financial services such as monetary payment and bill payment to a user.

In operation, the mobile payment may be initiated by displaying a payment code through a communications software (for example, instant messaging software) or payment software. However, currently, a payment process using the payment code has the following disadvantages: When a user is waiting to pay, the payment code is exposed on a mobile phone terminal. As a result, a screenshot of the payment code is easily taken in backend or the payment code is easily captured by others with a camera. In addition, as the payment code is used for offline payment, and in most payment scenarios, the payment can be completed directly by using the payment code without user identity authentication. Once the payment code is obtained by others and used for shopping, money loss to the user is caused.

Currently, no effective solution has been proposed for the technical problem of relatively low security in the mobile payment mode in the related art.

SUMMARY

Embodiments of the present disclosure provide an information display method and apparatus, a storage medium, and an electronic device, to resolve at least a technical problem of relatively low security in a mobile payment mode in the related art.

According to an aspect of the embodiments of the present disclosure, an information display method is provided. The method includes: obtaining, by a terminal, resource transfer information used for transferring a resource; splitting, by the terminal, the resource transfer information into multiple pieces of resource transfer sub information; and displaying, by the terminal, a dynamic screen for indicating the resource transfer sub information. A quantity of pieces of the resource transfer sub information indicated on the dynamic screen at one moment is less than a total quantity of the multiple pieces of resource transfer sub information.

According to another aspect of the embodiments of the present disclosure, a non-transitory storage medium storing computer instructions is provided. The computer instructions, when being executed by a processor, cause the processor to perform: obtaining resource transfer information used for transferring a resource; splitting the resource transfer information into multiple pieces of resource transfer sub information; and displaying a dynamic screen for indicating the resource transfer sub information. A quantity of pieces of the resource transfer sub information indicated on the dynamic screen at one moment is less than a total quantity of the multiple pieces of resource transfer sub information.

According to another aspect of the embodiments of the present disclosure, an electronic device is provided. The electronic device includes a memory and a processor coupled to the memory. The processor is configured to: obtain resource transfer information used for transferring a resource; split the resource transfer information into multiple pieces of resource transfer sub information; and display a dynamic screen for indicating the resource transfer sub information. A quantity of pieces of the resource transfer sub information indicated on the dynamic screen at one moment is less than a total quantity of the multiple pieces of resource transfer sub information.

BRIEF DESCRIPTION OF THE DRAWINGS

The accompanying drawings described herein are used to provide a further understanding of the present disclosure, and form a part of the present disclosure. Exemplary embodiments of the present disclosure and descriptions thereof are used to explain the present disclosure, and do not constitute any inappropriate limitation to the present disclosure. In the accompanying drawings.

DESCRIPTION OF EMBODIMENTS

To make a person skilled in the art understand solutions of the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The terms such as "first" and "second" in the specification, claims of the present disclosure, and the foregoing accompanying drawings of the present disclosure that are intended to distinguish between similar objects rather than describe a particular sequence or a chronological order. It is understood that the data termed in such a way are interchangeable in proper circumstances so that the embodiments of the present disclosure described herein can be implemented in orders except the order illustrated or described herein. In addition, the terms "include", "comprise" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

First, some terms in the descriptions of the embodiments of the present disclosure are explained as follows:

A payment code is a string of digits having a special meaning, presented in a form of a QR code or a barcode, and mainly used for offline payment. A use mode is that a user terminal shows the payment code, and a merchant scans the payment code through a barcode scanner to implement a deduction.

According to an aspect of the embodiments of the present disclosure, a method embodiment of an information display method is provided.

Figure 1:
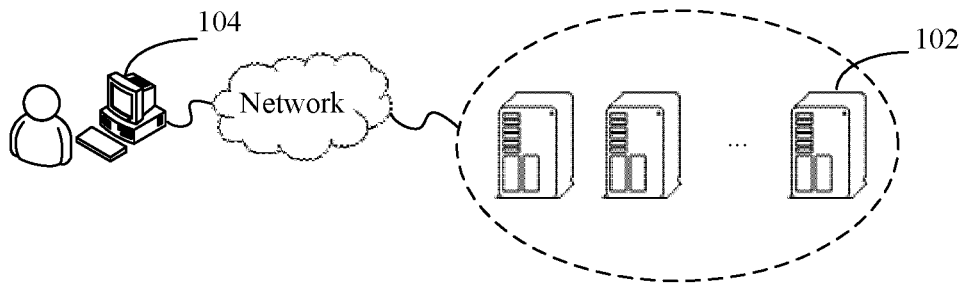
FIG. 1 is a schematic diagram of a hardware environment of an information display method according to an embodiment of the present disclosure.

Optionally, in some embodiments, the information display method may be applied to a hardware environment including a server 102 and a terminal 104 shown in FIG. 1. As shown in FIG. 1, the server 102 is connected to the terminal 104 through a network. The network includes, but is not limited to, a wide area network, a metropolitan area network, or a local area network. The terminal 104 is not limited to a PC, a mobile phone, a tablet computer, and the like. The information display method in some embodiments of the present disclosure may be performed by the server 102, or may be performed by the terminal 104, or may be performed jointly by the server 102 and the terminal 104. The information display method performed by the terminal 104 in some embodiments of the present disclosure may specifically be performed by a client installed on the terminal 104.

When the information display method in some embodiments of the present disclosure is independently performed by the server or the terminal, program code corresponding to the method in the present disclosure is directly performed on the server or the terminal.

When the information display method in some embodiments of the present disclosure is performed jointly by the server and the terminal, the terminal sends resource transfer information to the server. In this case, the server executes the program code corresponding to the method in the present disclosure, and feeds back a splitting result (a first preset quantity of pieces of resource transfer sub information) to the terminal for display.

Figure 2:
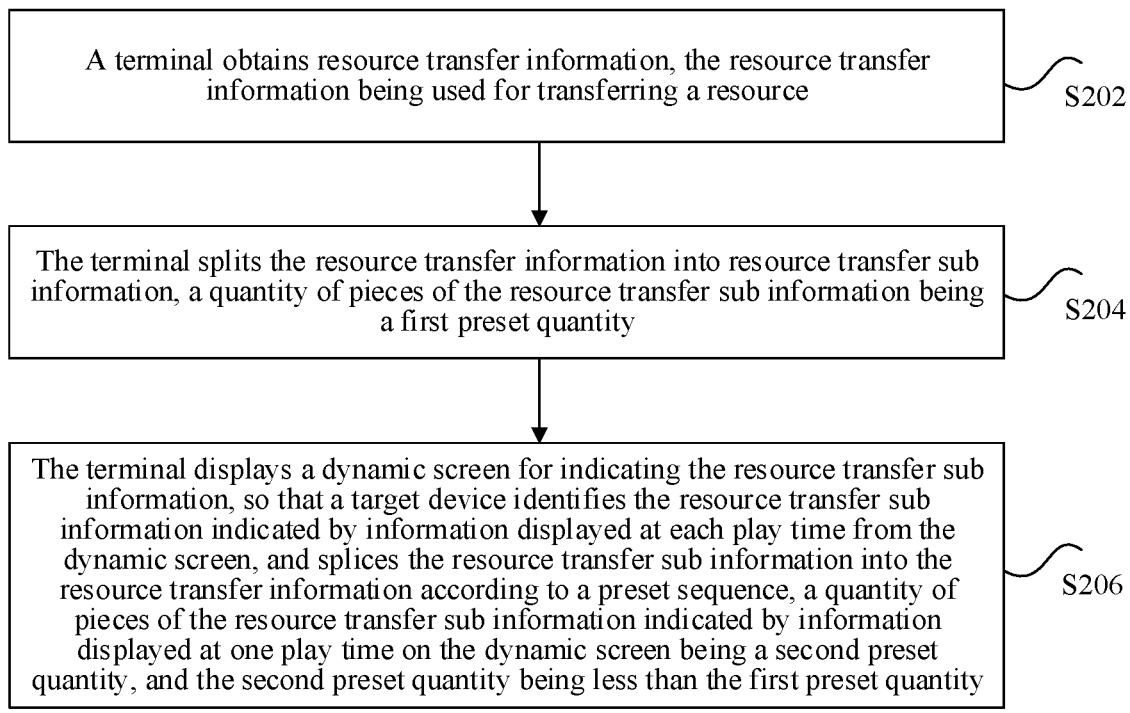
FIG. 2 is a flowchart of an optional information display method according to an embodiment of the present disclosure.

Descriptions are made below by using an example in which the terminal executes the program code corresponding to the method in the present disclosure. FIG. 2 is a flowchart of an optional information display method according to an embodiment of the present disclosure. As shown in FIG. 2, the method may include the following steps:

Step S202. A terminal obtains resource transfer information, the resource transfer information being used for transferring a resource.

Optionally, the resource transfer information may be generated by the terminal or a server, and is displayed by the terminal. For example, when the resource transfer information is generated by the terminal, the resource transfer information generated by the terminal (for example, a mobile terminal) is obtained. The resource transfer information is used for transferring the resource of an account on the terminal. For another example, when the resource transfer information is generated by the server, the terminal obtains the resource transfer information from the server.

The resource transfer information is credential information for transferring the resource, and a form for carrying the resource transfer information includes, but is not limited to: character or digital information, pattern information, and identification information.

The resource is a virtual resource, including but not limited to, virtual resources such as stocks, funds, money, bonds, gold coins, red envelopes, discount coupons, and the like. Other terminals having resource transfer permission may transfer a virtual resource of the account on the terminal by using the resource transfer information.

Step S204. The terminal splits the resource transfer information into multiple pieces of resource transfer sub information, a quantity of pieces of the resource transfer sub information being a first preset quantity.

Step S206. The terminal displays a dynamic screen for indicating the resource transfer sub information, so that a target device identifies the resource transfer sub information indicated by information displayed at each play time from the dynamic screen, and splices the resource transfer sub information into the resource transfer information according to a preset sequence, a quantity of pieces of the resource transfer sub information indicated by information displayed at one play time on the dynamic screen being a second preset quantity, and the second preset quantity being less than the first preset quantity. In other words, the terminal displays a dynamic screen for indicating the resource transfer sub information, and a quantity of pieces of the resource transfer sub information indicated on the dynamic screen at one moment is less than a total quantity of the multiple pieces of resource transfer sub information. Further, the multiple pieces of resource transfer sub information are configured to be identified and combined by a target device, the target device corresponding to a transfer destination of the resource.

Each piece of the resource transfer sub information is represented by the information displayed at one play time on the dynamic screen. The information displayed at one play time on the dynamic screen may represent one piece of the resource transfer sub information, or may represent more than one piece of the resource transfer sub information, which is less than a total quantity, that is, the first quantity, of pieces of the resource transfer sub information. It is understood that the information displayed at one play time on the dynamic screen does not represent all of the resource transfer sub information, but represents only some pieces of the resource transfer sub information.

Optionally, the mobile terminal may display the dynamic screen for indicating the resource transfer sub information. Each piece of the resource transfer sub information is represented by the information displayed at one play time on the dynamic screen (the total quantity is the first preset quantity), and the information displayed at one play time on the dynamic screen represents one piece of the resource transfer sub information. In some other embodiments, more than one pieces of resource transfer sub information may be indicated on the dynamic screen at one play time (i.e., one moment), the number of pieces of resource transfer sub information being indicated at one moment being less than the total number of pieces of resource transfer sub information.

The dynamic screen is a screen displayed on a display interface of the terminal. The dynamic screen may be displayed in a full screen mode in the display interface, or may be displayed in a partial area in the display interface.

The information displayed at any play time may be one piece of the resource transfer sub information, or may be at least one piece of the resource transfer sub information, which is less than the total quantity of pieces of the resource transfer sub information, or may be blank information or other information than the resource transfer sub information.

Optionally, the dynamic screen may be a dynamic picture. In a process in which the mobile terminal displays the dynamic screen, because the dynamic screen is dynamically displayed, considering that capturing the dynamic screen needs focusing and the like, the dynamic screen is not easily captured by other devices. In addition, only some pieces of the resource transfer information (namely, one piece of the resource transfer sub information or less than the total quantity of pieces of the resource transfer sub information) may be displayed at any play time. A sneaker cannot transfer a resource by using the some pieces of the resource transfer sub information.

By performing step S202 to step S206, after obtaining the resource transfer information, the terminal splits the resource transfer information into the resource transfer sub information (the total quantity is the first preset quantity). The terminal displays the dynamic screen for indicating the resource transfer sub information. Each piece of the resource transfer sub information is represented by the information displayed at one play time on the dynamic screen. In other words, one piece of the resource transfer sub information is displayed or less than the total quantity of pieces of the resource transfer sub information is displayed at any play time, so that a technical problem of relatively low security in a mobile payment mode in the related art can be resolved, and the security of mobile payment can be improved.

Implementation solutions of the present disclosure are described below in detail with reference to steps in FIG. 2.

In the technical solution provided in step S202, the terminal (for example, the mobile terminal) obtains the resource transfer information, the resource transfer information being used for transferring the resource.

When there is a resource transfer need, the mobile terminal generates the resource transfer information.

For example, when the mobile terminal detects a payment event (specifically, a user needs to pay with money), the mobile terminal obtains a payment code that is generated by the mobile terminal according to an account number. The resource transfer information includes the payment code. The mobile terminal may complete the payment by using the payment code.

For another example, when the mobile terminal detects a resource transfer event (for example, transfer of a virtual resource such as stocks, funds, bonds, gold coins, red envelopes, or discount coupons) of the account, the mobile terminal obtains the resource transfer information that is generated by the mobile terminal according to an account number, to transfer the virtual resource to the account, or transfer the virtual resource on the account to other accounts by taking the resource transfer information as a credential.

In the technical solution provided in step S204, the terminal splits the resource transfer information into the resource transfer sub information, the quantity of pieces of the split resource transfer sub information being the first preset quantity. The first preset quantity of pieces of the resource transfer sub information refers to that the quantity of pieces of the resource transfer sub information is greater than one (excluding one), for example, two or four.

Step S2042. The terminal detects a validity of the resource transfer information.

Optionally, to ensure the security of resource transfer, credential information (that is, resource transfer information) of each resource transfer has a validity. Therefore, before splitting the resource transfer information into the resource transfer sub information, the terminal first detects the validity of the obtained resource transfer information, that is, detects whether the resource transfer information is within a time range allowed by the validity (for example, the resource transfer information is valid within a specified duration, such as 30 seconds, one minute, or two minutes, after being generated).

When the validity of the obtained resource transfer information expires (that is, the resource transfer information is beyond the time range allowed by the validity), the terminal re-obtains resource transfer information and splits the re-obtained resource transfer information into resource transfer sub information.

When the validity of the obtained resource transfer information has not expired, the terminal directly splits the resource transfer information into the resource transfer sub information.

Step S2042. The terminal splits the resource transfer information into the resource transfer sub information. The splitting includes, but is not limited to, the following manners:

A manner 1 is splitting according to a specified information length.

The terminal splits the resource transfer information into the resource transfer sub information according to a preset information length. In other words, the terminal can split the resource transfer information into the first preset quantity of pieces of the resource transfer sub information by using a preset information length as a unit length. Further, when an information length of the resource transfer information is not divisible by the preset information length, an information length of one piece of the resource transfer sub information is a remainder obtained by dividing the information length of the resource transfer information by the preset information length.

Figure 3:
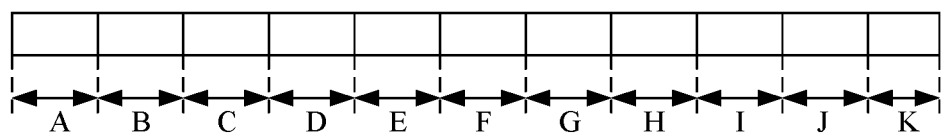
FIG. 3 is a schematic diagram of optional resource transfer information according to an embodiment of the present disclosure.

For example, the length of the resource transfer information is 1080 bits, and the preset information length is 100 bits. Therefore, the resource transfer information may be split into 11 pieces of the resource transfer sub information (A to K shown in FIG. 3). 10 pieces (A to J) of the resource transfer sub information has an information length of 100 bits, and the remaining one piece (K) has an information length of 80 bits. Each piece of the resource transfer sub information is carried in one first picture. The manner of carrying includes, but is not limited to, a QR code and a barcode. Optionally, the resource transfer information such as the account number, resource information (a resource type or a resource amount that needs to be transferred) may be compiled into a QR code or a barcode.

A display sequence of the first preset quantity of first pictures may be the same as a splitting sequence (that is, from A to K) of the resource transfer sub information. For example, in the first preset quantity of first pictures, a first picture carrying A is displayed at the first place, a first picture carrying B is displayed at the second place, and so on.

If the display sequence of the first preset quantity of first pictures is different from the splitting sequence of the resource transfer sub information, the first pictures need to indicate the splitting sequence of the carried resource transfer sub information. For example, the first picture carrying A needs to indicate that the carried information (for example, a QR code and a barcode) is in the first place in the splitting sequence of the resource transfer sub information, the first picture carrying B needs to indicate that the carried information is in the second place in the splitting sequence of the resource transfer sub information, and so on. In some embodiments, each picture may contain N pieces of resource transfer sub information, N being an integer greater than 1. Provided that the total quantity of pieces of resource transfer sub information is M, the quantity of pictures may be the least integer greater than or equal to M/N. For example, when there are 7 pieces of resource transfer sub information, the first 3 pictures may each contain 2 pieces of resource transfer sub information, and the $4^{th}$ picture may contain 1 piece of resource transfer sub information.

A manner 2 is splitting according to a specified quantity of pieces of the sub information.

The terminal splits the resource transfer information into the resource transfer sub information. The quantity of split pieces is the same as the preset first preset quantity. In this manner, lengths of different pieces of the resource transfer sub information may be different.

Optionally, in the technical solution provided in step S204, the terminal may further add the resource transfer sub information into the dynamic screen as follows:

The terminal encrypts the resource transfer sub information according to a preset encryption algorithm by using a first key (which may be a specific key always fixed or one of a plurality of keys selected by the terminal), and adds the encrypted resource transfer sub information into a specific screen in a form of a QR code or a barcode.

For how to decrypt the encrypted resource transfer sub information, refer to the following description.

In the technical solution provided in step S206, the terminal displays the dynamic screen for indicating the resource transfer sub information, so that the target device identifies the resource transfer sub information indicated by the information displayed at each play time from the dynamic screen, and splices the resource transfer sub information into the resource transfer information according to the preset sequence, the quantity of pieces of the resource transfer sub information indicated by the information displayed at one play time on the dynamic screen being the second preset quantity, and the second preset quantity being less than the first preset quantity.

The dynamic screen may include a first preset quantity of first pictures displayed according to the preset sequence. The first preset quantity of first pictures may be displayed on the mobile terminal according to the preset sequence by displaying the dynamic screen for indicating the first preset quantity of pieces of the resource transfer sub information. Each piece of the resource transfer sub information is displayed on one first picture.

Figure 4:
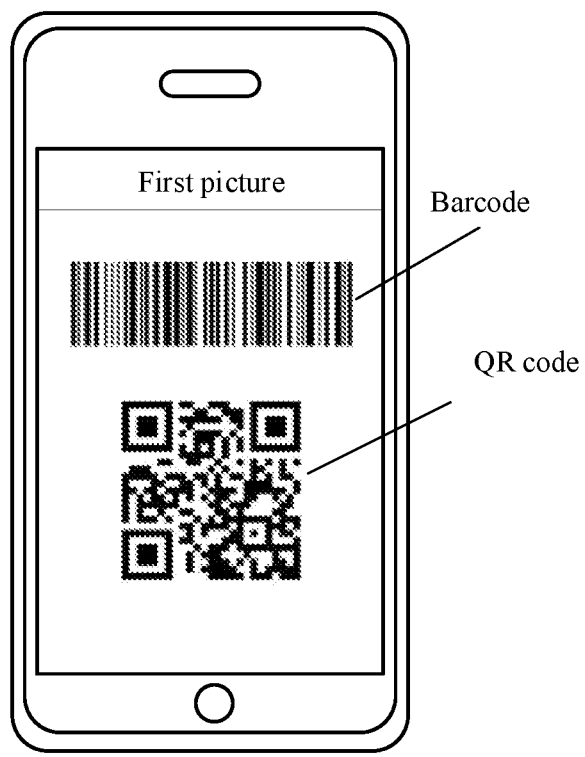
FIG. 4 is a schematic diagram of an optional target pattern according to an embodiment of the present disclosure.

Optionally, displaying the first preset quantity of first pictures on the mobile terminal according to the preset sequence may be displaying, on the mobile terminal according to the preset sequence, the first pictures carrying a target pattern. As shown in FIG. 4, the target pattern in each first picture is used for indicating a corresponding piece of the resource transfer sub information. The target pattern includes a barcode and/or a two-dimensional code, such as a Quick Response (QR) code.

Optionally, some embodiments of the present disclosure may further include step S208.

In the technical solution provided in step S208, in a case that the terminal displays the dynamic screen for indicating the resource transfer sub information, the target device (a barcode scanner) identifies the resource transfer sub information indicated by the information displayed at each play time on the dynamic screen, splices/combines/integrates the resource transfer sub information into the resource transfer information according to the preset sequence, and transfers the resource (for example, a resource of a login account on the terminal) according to the resource transfer information.

Optionally, the mobile terminal displays the first preset quantity of pieces of sub pictures (the first pictures) with a preset duration as a display period. For example, the sub pictures are repeatedly displayed according to a preset sequence in loop. The display period is the duration of displaying all sub pictures for once, i.e., one loop. Display durations of any two sub pictures in the display period (i.e., in one loop) are the same.

If the resource transfer sub information indicated by the first pictures is unencrypted information, the target device may directly obtain the resource transfer sub information and recombine the resource transfer sub information into the resource transfer information.

If the resource transfer sub information indicated by the first pictures is encrypted information, the target device needs to decrypt the resource transfer sub information.

When the target device needs to decrypt the resource transfer sub information, the target device needs to communicate with the mobile terminal to obtain a corresponding decryption key and/or decryption algorithm, to decrypt the resource transfer sub information by using the decryption key and the decryption algorithm.

A process in which the target device obtains the corresponding decryption key and/or decryption algorithm is actually also a verification process on the target device. For example, the target device first sends a request to the mobile terminal (including but not limited to sending through a server, or sending through Bluetooth or near field communication mode (NFC)). After verifying the target device successful, the mobile terminal sends the corresponding decryption key and/or decryption algorithm to the target device.

Optionally, to improve the security of a transaction, several pictures including false resource transfer sub information may be provided. When the transaction is performed, only after verifying the target device successful, the mobile terminal sends an identifier of a picture carrying true resource transfer sub information to the target device, for the target device to perform a resource transfer operation.

In some embodiments of the present disclosure, use of the provided method includes, but is not limited to, the following scenarios: (1) performing, by the mobile terminal, a mobile payment for a bill; (2) performing a transaction of a virtual resource (such as funds, stocks); and (3) issuing a virtual resource (such as gold coins or red envelopes).

In an optional embodiment, a mobile payment is used as an example to describe the embodiments of the present disclosure in detail below.

Figure 5:
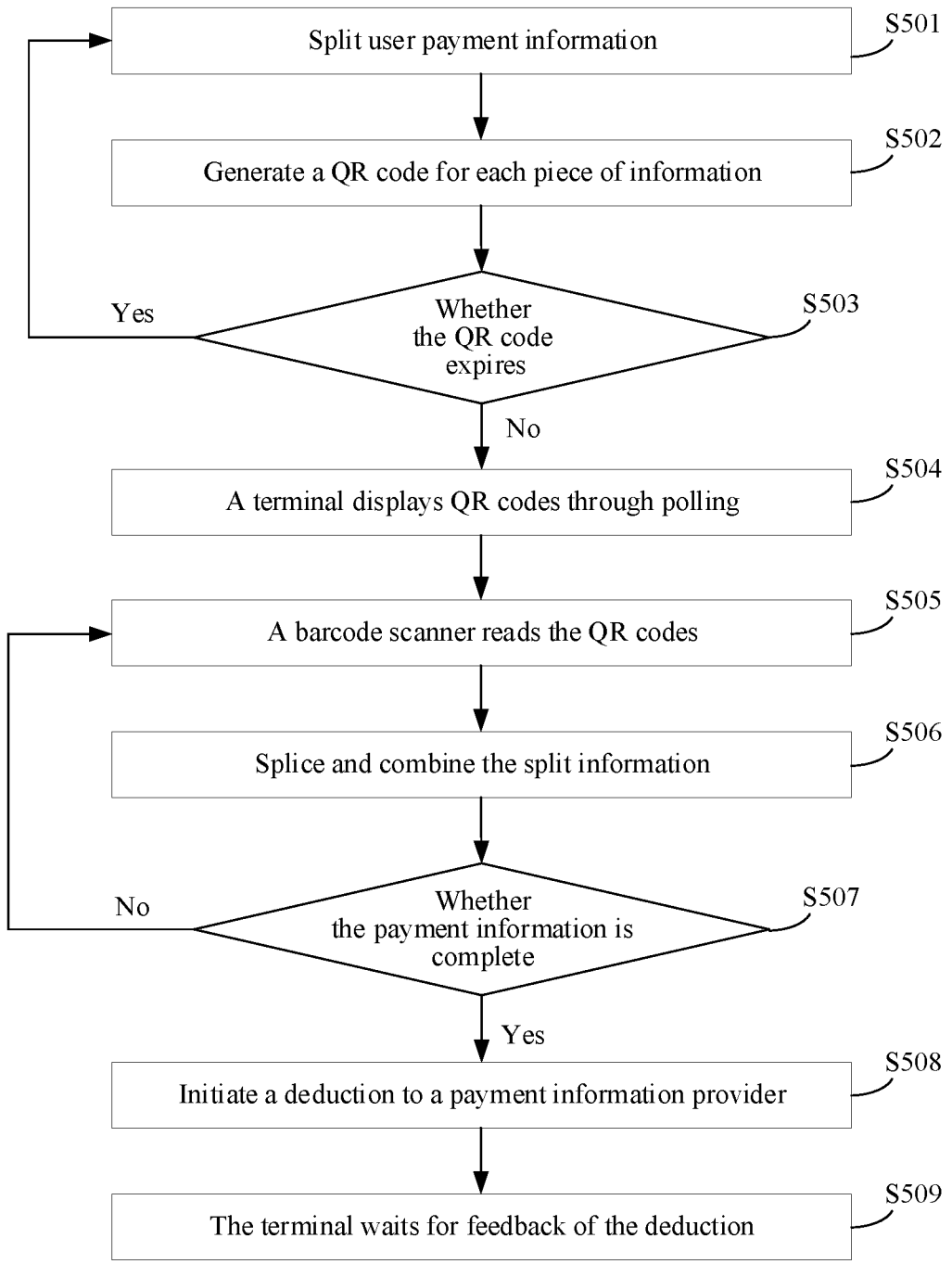
FIG. 5 is a flowchart of an optional information display method according to an embodiment of the present disclosure.

After a user enters a payment code interface, a payment code keeps changing. When a barcode scanner is aimed at the payment code, the barcode scanner may obtain complete payment information within one polling period, to finish the payment. The security of offline use of the payment code is improved, and the loss of user's money due to theft by others is prevented. As shown in FIG. 5:

Step S501. Split user payment information (namely, the resource transfer information).

The terminal splits the user payment information, which may be as follows: The terminal and the barcode scanner (that is, the target device) agree on a splitting and splicing protocol, and the terminal averagely splits the user payment information (a character string) into 20 parts according to a specific length, and a length of the last part may be less than an average length.

Step S502. Generate a QR code for each piece of information (the resource transfer sub information).

The terminal generates a QR code for each piece of the split information. Each QR code has a validity.

Step S503. Check whether the QR code expires.

Whether the QR code expires is checked. If the QR code expires, step S501 is performed for re-splitting; otherwise, a next step S504 is performed.

Step S504. The terminal displays QR codes (that is, displays the first preset quantity of first pictures) through polling.

Step S505. The barcode scanner reads the QR codes.

Step S506. The barcode scanner splices the split information according to the protocol "the terminal averagely splits the user payment information (a character string) into 20 parts according to a specific length, and a length of the last part may be less than an average length" agreed on with the terminal in advance.

Step S507. Check whether the payment information is complete. If the payment information is complete, a next step S508 is performed; otherwise, step S505 is performed.

Step S508. If the payment information is complete, initiate a deduction to a payment information provider. Otherwise, re-read the QR code (after waiting for generation and display of a valid two-dimensional code as the QR code may expire in the reading process).

Step S509. The terminal waits for feedback of the deduction.

In the foregoing implementation, after the payment code interface is displayed, dozens of QR codes start to be displayed through polling, and a user sees a dynamically changing QR code. When the barcode scanner is aimed at the payment code, the barcode scanner obtains some pieces of the payment information from the dozens of QR codes within one polling period of the payment code. When the complete payment information is successfully combined, the barcode scanner emits a sound to give feedback that code scanning is finished. When the barcode scanner obtains the complete payment information, the terminal in which the payment code is located is instructed through a network to jump to an interface waiting for payment completion.

A current payment code is a static picture including information for a user to complete a payment. When the user stays on the payment code interface, a screenshot may be taken for the payment code in background or the payment code may be captured by others with a camera. The payment code leakage may cause the loss of user's money.

In the foregoing implementation, by using a fixed duration (for example, one second) as one polling period, the dozens of QR codes (or the barcodes) are dynamically displayed, where each QR code includes some pieces of the user payment information. In this way, the complete payment information is not leaked even if a screenshot is taken for a QR code or a QR code is captured, and the security of the payment using the payment code is improved.

Each of the foregoing method embodiments, for ease of description, the method embodiment is described as a series of action combinations, but a person skilled in the art may learn that the present disclosure is not limited to an order of described actions because according to the present disclosure, some steps may be performed in another order or at the same time. In addition, a person skilled in the art may also know that all the embodiments described in the specification are exemplary embodiments, and the related actions and modules are not necessarily required in the present disclosure.

According to the foregoing descriptions of implementations, the person skilled in the art may clearly know that the method according to the foregoing embodiments may be implemented by using software and a necessary general hardware platform, or certainly may be implemented by using hardware. However, in most cases, the former is a preferred implementation. Based on the understanding, the technical solutions of the present disclosure, or the part contributing to the related art, may essentially be presented in the form of a software product. The computer software product is stored in a storage medium (for example, a read-only memory (ROM)/random access memory (RAM), a magnetic disk, or an optical disc) including several instructions to enable a terminal device (which may be a mobile phone, a computer, a server, a network device, or the like) to perform the methods described in the embodiments of the present disclosure.

Figure 6:
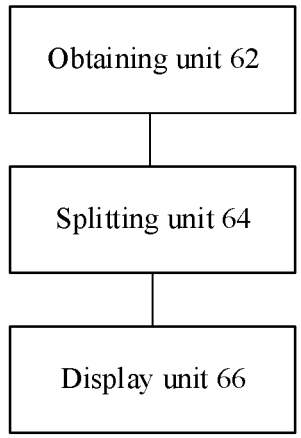
FIG. 6 is a schematic diagram of an optional information display apparatus according to an embodiment of the present disclosure.

According to an aspect of the embodiments of the present disclosure, an information display apparatus configured to perform the information display method is further provided. FIG. 6 is a schematic diagram of an optional information display apparatus according to an embodiment of the present disclosure. As shown in FIG. 6, the apparatus may include: an obtaining unit 62, a splitting unit 64, and a display unit 66.

The obtaining unit 62 is configured to obtain resource transfer information, the resource transfer information being used for transferring a resource.

The splitting unit 64 is configured to split the resource transfer information into resource transfer sub information, a quantity of pieces of the resource transfer sub information being a first preset quantity.

The display unit 66 is configured to display a dynamic screen for indicating the resource transfer sub information, so that a target device identifies the resource transfer sub information indicated by information displayed at each play time from the dynamic screen, and splices the resource transfer sub information into the resource transfer information according to a preset sequence, a quantity of pieces of the resource transfer sub information indicated by information displayed at one play time on the dynamic screen being a second preset quantity, and the second preset quantity being less than the first preset quantity.

Optionally, a mobile terminal may display the dynamic screen for indicating the resource transfer sub information, where each piece of the resource transfer sub information is represented by the information displayed at one play time on the dynamic screen.

The dynamic screen is a screen displayed on a display interface of the terminal. The dynamic screen may be displayed in a full screen mode in the display interface, or may be displayed in a partial area in the display interface.

Optionally, the dynamic screen may be a dynamic picture. In a process in which the mobile terminal displays the dynamic screen, because the dynamic screen is dynamically displayed, considering that capturing the dynamic screen needs focusing and the like, the dynamic screen is not easily captured by other devices. In addition, only some pieces of the resource transfer information may be displayed at any play time. A sneaker cannot transfer a resource by using one piece of the resource transfer sub information.

The obtaining unit 62 in some embodiments may be configured to perform step S202 in the embodiments of the present disclosure, the splitting unit 64 in some embodiments may be configured to perform step S204 in the embodiments of the present disclosure, and the display unit 66 in some embodiments may be configured to perform step S206 in the embodiments of the present disclosure.

Implemented examples and application scenarios of the foregoing units and corresponding steps are the same, but are not limited to the content disclosed by the foregoing embodiments. The foregoing units may be run in the hardware environment shown in FIG. 1 as a part of the apparatus, and may be implemented by using software, or may be implemented by using hardware.

By using the foregoing units/modules, after obtaining the resource transfer information, the terminal splits the resource transfer information into the resource transfer sub information, the quantity of pieces of the resource transfer sub information being the first preset quantity. The terminal displays the dynamic screen for indicating the resource transfer sub information, so that the target device identifies the resource transfer sub information indicated by the information displayed at each play time from the dynamic screen, and splices the resource transfer sub information into the resource transfer information according to the preset sequence. Each piece of the resource transfer sub information is represented by the information displayed at one play time on the dynamic screen. In other words, one piece of the resource transfer sub information is displayed or less than the total quantity of pieces of the resource transfer sub information is displayed at any play time, so that a technical problem of relatively low security in a mobile payment mode in the related art can be resolved, and the security of mobile payment can be improved.

Optionally, when there is a resource transfer need, the mobile terminal generates the resource transfer information.

For example, when the mobile terminal detects a payment event, the obtaining unit obtains a payment code that is generated by the mobile terminal according to an account number. The resource transfer information includes the payment code.

For another example, when the mobile terminal detects a resource transfer event (for example, transfer of a virtual resource such as stocks, funds, bonds, gold coins, red envelopes, or discount coupons) of the account, the obtaining unit obtains the resource transfer information that is generated by the mobile terminal according to an account number, to transfer the virtual resource to the account, or transfer the virtual resources on the account to other accounts by taking the resource transfer information as a credential.

Optionally, the splitting unit 64 may split the resource transfer information into the resource transfer sub information by performing the following steps:

Step S2042. Detect a validity of the resource transfer information.

Optionally, to ensure the security of resource transfer, credential information (that is, resource transfer information) of each resource transfer has a validity. Therefore, before splitting the resource transfer information into the first preset quantity of pieces of the resource transfer sub information, the terminal first detects the validity of the obtained resource transfer information, that is, detects whether the resource transfer information is within a time range allowed by the validity (for example, the resource transfer information is valid within a specified duration, such as 30 seconds, one minute, or two minutes, after being generated).

When the validity of the obtained resource transfer information expires (that is, the resource transfer information is beyond the time range allowed by the validity), the terminal re-obtains resource transfer information and splits the re-obtained resource transfer information into resource transfer sub information.

When the validity of the obtained resource transfer information has not expired, the splitting unit 64 directly splits the resource transfer information into the resource transfer sub information.

Step S2042. Split the resource transfer information into the resource transfer sub information. The splitting includes, but is not limited to, the following manners:

A manner 1 is splitting according to a specified information length.

The splitting unit 64 splits the resource transfer information into the resource transfer sub information according to a preset information length, where in a case that an information length of the resource transfer information is not divisible by the preset information length, an information length of one piece of the resource transfer sub information is a remainder obtained by dividing the information length of the resource transfer information by the preset information length.

For example, the length of the resource transfer information is 1080 bits, and the preset information length is 100 bits. Therefore, the resource transfer information may be split into 11 pieces of the resource transfer sub information (A to K shown in FIG. 3). 10 pieces (A to J) of the resource transfer sub information has an information length of 100 bits, and the remaining one piece (K) has an information length of 80 bits. Each piece of the resource transfer sub information is carried in one first picture. The manner of carrying includes, but is not limited to, a QR code and a barcode. Optionally, the resource transfer information such as the account number, resource information (a resource type or a resource amount that needs to be transferred) may be compiled into a QR code or a barcode.

A display sequence of the first preset quantity of first pictures may be the same as a splitting sequence (that is, from A to K) of the resource transfer sub information. For example, in the first preset quantity of first pictures, a first picture carrying A is displayed at the first place, a first picture carrying B is displayed at the second place, and so on.

If the display sequence of the first preset quantity of first pictures is different from the splitting sequence of the resource transfer sub information, the first pictures need to indicate the splitting sequence of the carried resource transfer sub information. For example, the first picture carrying A needs to indicate that the carried information (for example, a QR code and a barcode) is in the first place in the splitting sequence of the resource transfer sub information, the first picture carrying B needs to indicate that the carried information is in the second place in the splitting sequence of the resource transfer sub information, and so on.

A manner 2 is splitting according to a specified quantity of pieces of the sub information.

The splitting unit 64 splits the resource transfer information into the resource transfer sub information. The quantity of split pieces is the same as the preset first preset quantity. In this manner, lengths of different pieces of the resource transfer sub information may be different.

Optionally, the dynamic screen includes a preset quantity of first pictures displayed according to the preset sequence. The display unit 66 is further configured to display the first preset quantity of first pictures according to the preset sequence. Each piece of the resource transfer sub information is displayed on one first picture.

The display unit 66 is further configured to display, according to the preset sequence, the first pictures carrying a target pattern, where the target pattern in each first picture is used for indicating a corresponding piece of the resource transfer sub information, and the target pattern includes a barcode and/or a QR code.

The obtaining unit 62 is further configured to obtain, when the mobile terminal detects a payment event, a payment code that is generated by the mobile terminal according to an account number. The resource transfer information includes the payment code.

Figure 7:
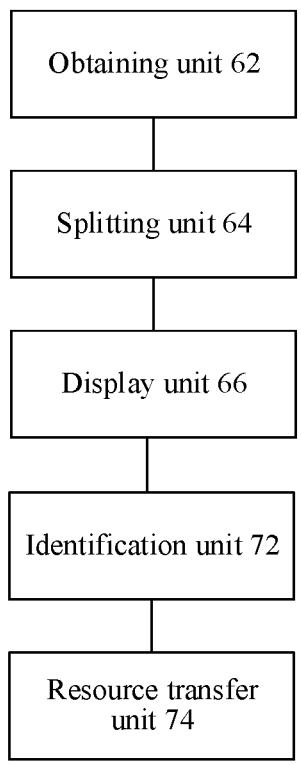
FIG. 7 is a schematic diagram of an optional information display apparatus according to an embodiment of the present disclosure.

Optionally, as shown in FIG. 7, the apparatus in the present disclosure may further include: an identification unit 72, configured to identify, when the dynamic screen for indicating the resource transfer sub information is displayed, the resource transfer sub information indicated by information displayed at each play time from the dynamic screen; and a resource transfer unit 74, configured to splice the resource transfer sub information into the resource transfer information according to the preset sequence, and transfer a resource according to the resource transfer information. The identification unit 72 and the resource transfer unit 74 may be located in a target device.

Optionally, the mobile terminal displays the first preset quantity of pieces of sub pictures (the first pictures) with a preset duration as a display period. Display durations of any two sub pictures in the display period are the same.

If the resource transfer sub information indicated by the first pictures is unencrypted information, the target device may directly obtain the resource transfer sub information and recombine the resource transfer sub information into the resource transfer information.

If the resource transfer sub information indicated by the first pictures is encrypted information, the target device needs to decrypt the resource transfer sub information.

When the target device needs to decrypt the resource transfer sub information, the target device needs to communicate with the mobile terminal to obtain a corresponding decryption key and/or decryption algorithm, to decrypt the resource transfer sub information by using the decryption key and the decryption algorithm.

A process in which the target device obtains the corresponding decryption key and/or decryption algorithm is actually also a verification process on the target device. For example, the target device first sends a request to the mobile terminal (including but not limited to sending through a server, or sending through Bluetooth or NFC). After verifying the target device successful, the mobile terminal sends the corresponding decryption key and/or decryption algorithm to the target device.

Optionally, to improve the security of a transaction, several pictures including false resource transfer sub information may be provided. When the transaction is performed, only after verifying the target device successful, the mobile terminal sends an identifier of a picture carrying true resource transfer sub information to the target device, for the target device to perform a resource transfer operation.

In some embodiments of the present disclosure, use of the provided method includes, but is not limited to, the following scenarios: (1) performing, by the mobile terminal, a mobile payment for a bill; (2) performing a transaction of a virtual resource (such as funds, stocks); and (3) issuing a virtual resource (such as gold coins or red envelopes).

In an implementation of the application, after the payment code interface is displayed, dozens of QR codes to be displayed through polling, and a user sees a dynamically changing QR code. When the barcode scanner is aimed at the payment code, the barcode scanner obtains some pieces of payment information from the dozens of QR codes within one polling period of the payment code. When the complete payment information is successfully combined, the barcode scanner emits a sound to give feedback that code scanning is finished. When the barcode scanner obtains the complete payment information, the terminal in which the payment code is located is instructed through a network to jump to an interface waiting for payment completion.

A current payment code is a static picture including information for a user to complete a payment. When the user stays on the payment code interface, a screenshot may be taken for the payment code in background or the payment code may be captured by others with a camera. The payment code leakage may cause the loss of user's money.

In the foregoing implementation, by using a fixed duration (for example, one second) as one polling period, the dozens of QR codes (or the barcodes) are dynamically displayed, where each QR code includes some pieces of the user payment information. In this way, the complete payment information is not leaked even if a screenshot is taken for a QR code or a QR code is captured, and the security of the payment using the payment code is improved.

Implemented examples and application scenarios of the foregoing units and corresponding steps are the same, but are not limited to the content disclosed by the foregoing embodiments. The foregoing modules as parts of the apparatus may run in the hardware environment shown in FIG. 1, and may be implemented by using software, or may be implemented by using hardware. The hardware environment includes a network environment.

According to an aspect of the embodiments of the present disclosure, a server or a terminal configured to perform the information display method is further provided.

According to an aspect of the embodiments of the present disclosure, a storage medium is further provided, storing a program, the program, when run, performing the information display method according to the foregoing aspect of the embodiments.

According to an aspect of the embodiments of the present disclosure, an electronic device is further provided, including a memory, a processor, and a computer program stored in the memory and executable on the processor, the processor performing the information display method according to the foregoing aspect of the embodiments by using the computer program.

Figure 8:
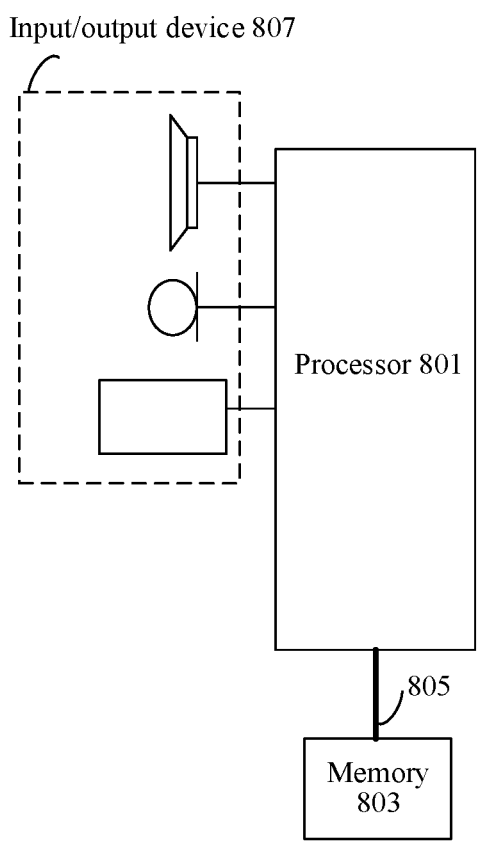
FIG. 8 is a structural block diagram of a terminal according to an embodiment of the present disclosure.

FIG. 8 is a structural block diagram of a terminal according to an embodiment of the present disclosure. As shown in FIG. 8, the terminal may include: one or more processors 801 (only one is shown in FIG. 8), a memory 803, and a transmission apparatus 805. As shown in FIG. 8, the terminal may further include an input/output device 807.

The memory 803 may be configured to store a software program and module, for example, a program instruction/module corresponding to the information display method and apparatus in the embodiments of the present disclosure, and the processor 801 runs the software program and module stored in the memory 803, to perform various function applications and data processing, that is, implement the information display method. The memory 803 may include a high-speed RAM, and may further include a non-volatile memory, for example, one or more magnetic storage apparatuses, flash memories, or other non-volatile solid-state memories. In some examples, the memory 803 may further include memories remotely disposed relative to the processor 801, and these remote memories may be connected to the terminal by using a network. Examples of the network include but are not limited to the Internet, an intranet, a local area network, a mobile communications network, and a combination thereof.

The transmission apparatus 805 is configured to receive or send data by using a network, or may further be configured to transmit data between the processor and the memory. Examples of the network may include a wired network and a wireless network. In an example, the transmission apparatus 805 includes a network interface controller (NIC) that may be connected to another network device and router by using a cable, to communicate with the Internet or a local area network. In an embodiment, the transmission apparatus 805 is a radio frequency (RF) module that is configured to communicate with the Internet in a wireless manner.

The memory 803 may be configured to store an application program.

The processor 801 may invoke, by using the transmission apparatus 805, the application program stored in the memory 803, to perform the following steps:

S1. Obtain resource transfer information, the resource transfer information being used for transferring a resource.

S2. Split the resource transfer information into resource transfer sub information, a quantity of pieces of the resource transfer sub information being a first preset quantity.

S3. Display a dynamic screen for indicating the resource transfer sub information, so that a target device identifies the resource transfer sub information indicated by information displayed at each play time from the dynamic screen, and splices the resource transfer sub information into the resource transfer information according to a preset sequence, a quantity of pieces of the resource transfer sub information indicated by information displayed at one play time on the dynamic screen being a second preset quantity, and the second preset quantity being less than the first preset quantity.

The processor 801 is further configured to perform the following step:

splitting the resource transfer information into the resource transfer sub information according to a preset information length, where in a case that an information length of the resource transfer information is not divisible by the preset information length, an information length of one piece of the resource transfer sub information is a remainder obtained by dividing the information length of the resource transfer information by the preset information length; or splitting the resource transfer information into the first preset quantity of pieces of the resource transfer sub information, where the quantity of pieces of the resource transfer information is the same as a quantity of first pictures in the preset dynamic screen.

According to some embodiments of the present disclosure, after obtaining the resource transfer information, the terminal splits the resource transfer information into the resource transfer sub information, the quantity of pieces of the resource transfer sub information being the first preset quantity. The terminal displays the dynamic screen for indicating the resource transfer sub information, so that the target device identifies the resource transfer sub information indicated by the information displayed at each play time from the dynamic screen, and splices the resource transfer sub information into the resource transfer information according to the preset sequence, the quantity of pieces of the resource transfer sub information indicated by the information displayed at one play time on the dynamic screen being the second preset quantity, and the second preset quantity being less than the first preset quantity, so that a technical problem of relatively low security in the mobile payment mode in the related art can be resolved, and the security of mobile payment can be improved.

Optionally, for an example in some embodiments, reference may be made to the examples described in the foregoing embodiments, and details are not described again.

A person of ordinary skill in the art may understand that the structure shown in FIG. 8 is merely an example, and the terminal may be a terminal device such as a smartphone (for example, an Android mobile phone or an iOS mobile phone), a tablet computer, a palmtop computer, a mobile Internet device (MID), or a PAD. FIG. 8 does not constitute a limitation on the structure of the foregoing electronic device. For example, the terminal may further include more or fewer components (for example, a network interface and a display apparatus) than those shown in FIG. 8, or may have a configuration different from that shown in FIG. 8.

A person of ordinary skill in the art may understand that all or some of the steps in the methods of the foregoing embodiments may be implemented by a program instructing relevant hardware of the terminal device. The program may be stored in a computer-readable storage medium. The storage medium may include: a flash drive, a ROM, a RAM, a magnetic disk, an optical disc, or the like.

An embodiment of the present disclosure further provides a storage medium. Optionally, in some embodiments, the storage medium may be configured to store program code for performing the information display method.

Optionally, in some embodiments, the storage medium may be located on at least one of a plurality of network devices on the network shown in the foregoing embodiment.

Optionally, in some embodiments, the storage medium is configured to store the program code for performing the following steps:

S11. Obtain resource transfer information, the resource transfer information being used for transferring a resource.

S12. Split the resource transfer information into resource transfer sub information, a quantity of pieces of the resource transfer sub information being a first preset quantity.

S13. Display a dynamic screen for indicating the resource transfer sub information, so that a target device identifies the resource transfer sub information indicated by information displayed at each play time from the dynamic screen, and splices the resource transfer sub information into the resource transfer information according to a preset sequence, a quantity of pieces of the resource transfer sub information indicated by information displayed at one play time on the dynamic screen being a second preset quantity, and the second preset quantity being less than the first preset quantity.

Optionally, the storage medium is further configured to store program code for performing the following step:

S21. Split the resource transfer information into the resource transfer sub information according to a preset information length, where in a case that an information length of the resource transfer information is not divisible by the preset information length, an information length of one piece of the resource transfer sub information is a remainder obtained by dividing the information length of the resource transfer information by the preset information length.

S23. Split the resource transfer information into the resource transfer sub information, where the quantity of pieces of the resource transfer information is the same as a quantity of first pictures in the preset dynamic screen. S23 is an alternative step of S21.

Optionally, reference may be made to the examples described in the foregoing embodiments, and details are not described again.

Optionally, in some embodiments, the storage medium may include, but is not limited to, various media that can store the program code, such as a USB flash drive, a ROM, a RAM, a removable hard disk, a magnetic disk, and an optical disc.

The sequence numbers of the foregoing embodiments of the present disclosure are merely for the convenience of description, and do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present disclosure, or the part contributing to the related art, or all or some of the technical solutions may essentially be presented in the form of a software product. The computer software product is stored in the storage medium, and includes several instructions for instructing one or more computer devices (which may be a personal computer, a server, a network device, or the like) to perform all or some of the steps of the methods described in the embodiments of the present disclosure.

In the foregoing embodiments of the present disclosure, the descriptions of the embodiments have their respective focuses. For a part that is not described in detail in an embodiment, refer to related descriptions in other embodiments.

In the several embodiments provided in the present disclosure, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of the present disclosure. A person of ordinary skill in the art may further make some improvements and polishing without departing from the principle of the present disclosure and the improvements and polishing shall fall within the protection scope of the present disclosure.

INDUSTRIAL APPLICABILITY

In the embodiments, after obtaining the resource transfer information, the terminal splits the resource transfer information into the resource transfer sub information, the quantity of pieces of the resource transfer sub information being the first preset quantity. The terminal displays the dynamic screen for indicating the resource transfer sub information, so that the target device identifies the resource transfer sub information indicated by the information displayed at each play time from the dynamic screen, and splices the resource transfer sub information into the resource transfer information according to the preset sequence, each piece of the resource transfer sub information being represented by the information displayed at one play time on the dynamic screen, the quantity of pieces of the resource transfer sub information indicated by the information displayed at one play time on the dynamic screen being the second preset quantity, and the second preset quantity being less than the first preset quantity. The dynamic screen displays only some pieces of the resource transfer sub information at one play time, to improve the security of mobile payment.

What is claimed is:

1. An information display method, implemented by a computing terminal, comprising:
    obtaining resource transfer information for transferring a resource in response to a user operation that triggers a resource transfer event;
    splitting the resource transfer information into multiple pieces of resource transfer sub information;
    dynamically displaying, on a payment code interface presented by the computing terminal and scannable by a code scanner, a first preset quantity of first pictures arranged in a first sequence, wherein the payment code interface displays one picture at a time, and each of the multiple pieces of resource transfer sub information is displayed on one of the first pictures;
    checking whether a picture of the first pictures to be displayed on the payment code interface is expired;
    in response to determining that the picture is expired, re-splitting the resource transfer information into multiple re-split pieces of resource transfer sub information;
    dynamically displaying, on the payment code interface, a second preset quantity of second pictures arranged in a second sequence, wherein each of the re-split pieces of resource transfer sub information is displayed on one of the second pictures; and in response to the code scanner obtaining the resource transfer information from combining the split or re-split pieces of resource transfer sub information, displaying an interface indicating a result of the transferring of the resource.

2. The method according to claim 1, wherein each first picture and/or each second picture includes a barcode or a QR code.

3. The method according to claim 1, wherein dynamically displaying the first preset quantity of first pictures comprises:
displaying the first preset quantity of first pictures according to the first sequence in loop, and display durations of any two first pictures in one loop are the same.

4. The method according to claim 1, wherein dynamically displaying the second preset quantity of second pictures comprises:
displaying the second preset quantity of second pictures according to the second sequence in loop, and display durations of any two second pictures in one loop are the same.

5. The method according to claim 1, wherein the splitting and/or the re-splitting of the resource transfer information is performed by using a preset information length as a unit length.

6. The method according to claim 5, wherein when an information length of the resource transfer information is not divisible by the preset information length, an information length of one of the first preset quantity of pieces of the resource transfer sub information is a remainder obtained by dividing the information length of the resource transfer information by the preset information length.

7. The method according to claim 1, wherein the computing terminal corresponds to a transfer origin of the resource, and the code scanner corresponds to a transfer destination of the resource.

8. The method according to claim 1, wherein at least one of the first pictures include false resource transfer sub information, and the method further comprises:
verifying an identity of the code scanner;
in response to successfully verifying the code scanner, sending identifiers of the first pictures containing the true resource transfer sub information to the code scanner.

9. The method according to claim 1, wherein at least one of the second pictures include false resource transfer sub information, and the method further comprises:
verifying an identity of the code scanner;
in response to successfully verifying the code scanner, sending identifiers of the second pictures containing the true resource transfer sub information to the code scanner.

10. An electronic device, comprising a memory and a processor coupled to the memory, configured to perform:
obtaining resource transfer information for transferring a resource in response to a user operation that triggers a resource transfer event;
splitting the resource transfer information into multiple pieces of resource transfer sub information;
dynamically displaying, on a payment code interface presented by the computing terminal and scannable by a code scanner, a first preset quantity of first pictures arranged in a first sequence, wherein the payment code interface displays one picture at a time, and each of the multiple pieces of resource transfer sub information is displayed on one of the first pictures;
checking whether a picture of the first pictures to be displayed on the payment code interface is expired;
in response to determining that the picture is expired, re-splitting the resource transfer information into multiple re-split pieces of resource transfer sub information;
dynamically displaying, on the payment code interface, a second preset quantity of second pictures arranged in a second sequence, wherein each of the re-split pieces of resource transfer sub information is displayed on one of the second pictures; and
in response to the code scanner obtaining the resource transfer information from combining the split or re-split pieces of resource transfer sub information, displaying an interface indicating a result of the transferring of the resource.

11. The device according to claim 10, wherein each first picture includes a barcode or a QR code.

12. The device according to claim 10, wherein dynamically displaying the first preset quantity of first pictures comprises:
displaying the first preset quantity of first pictures according to the first sequence in loop, and display durations of any two first pictures in one loop are the same.

13. The device according to claim 10, wherein dynamically displaying the second preset quantity of second pictures comprises:
displaying the second preset quantity of second pictures according to the second sequence in loop, and display durations of any two second pictures in one loop are the same.

14. The device according to claim 10, wherein the splitting and/or the re-splitting of the resource transfer information is performed by using a preset information length as a unit length.

15. The device according to claim 14, wherein when an information length of the resource transfer information is not divisible by the preset information length, an information length of one of the first preset quantity of pieces of the resource transfer sub information is a remainder obtained by dividing the information length of the resource transfer information by the preset information length.

16. The device according to claim 10, wherein the electronic device corresponds to a transfer origin of the resource, and the code scanner corresponds to a transfer destination of the resource.

17. The device according to claim 10, wherein at least one of the first pictures include false resource transfer sub information, and the processor is further configured to perform:
verifying an identity of the code scanner;
in response to successfully verifying the code scanner, sending identifiers of the first pictures containing the true resource transfer sub information to the code scanner.

18. The device according to claim 10, wherein at least one of the second pictures include false resource transfer sub information, and the processor is further configured to perform:
verifying an identity of the code scanner;
in response to successfully verifying the code scanner, sending identifiers of the second pictures containing the true resource transfer sub information to the code scanner.

19. A non-transitory computer readable storage medium storing computer instructions, the computer instructions, when being executed by a processor of a computing terminal, causing the processor to perform:
- obtaining resource transfer information for transferring a resource in response to a user operation that triggers a resource transfer event;
- splitting the resource transfer information into multiple pieces of resource transfer sub information;
- dynamically displaying, on a payment code interface presented by the computing terminal and scannable by a code scanner, a first preset quantity of first pictures arranged in a first sequence, wherein the payment code interface displays one picture at a time, and each of the multiple pieces of resource transfer sub information is displayed on one of the first pictures;
- checking whether a picture of the first pictures to be displayed on the payment code interface is expired;
- in response to determining that the picture is expired, re-splitting the resource transfer information into multiple re-split pieces of resource transfer sub information;
- dynamically displaying, on the payment code interface, a second preset quantity of second pictures arranged in a second sequence, wherein each of the re-split pieces of resource transfer sub information is displayed on one of the second pictures; and
- in response to the code scanner obtaining the resource transfer information from combining the split or re-split pieces of resource transfer sub information, displaying an interface indicating a result of the transferring of the resource.

20. The non-transitory computer readable storage medium according to claim 19, wherein the splitting and/or the re-splitting of the resource transfer information is performed by using a preset information length as a unit length.

* * * * *